US011718348B2

(12) United States Patent
Lopera et al.

(10) Patent No.: US 11,718,348 B2
(45) Date of Patent: Aug. 8, 2023

(54) UPPER FRAME FOR AN OFF-ROAD VEHICLE

(71) Applicant: Polaris Industries Inc., Medina, MN (US)

(72) Inventors: Richard Mark Lopera, Lake Elsinore, CA (US); Jeremy Brown, Menifee, CA (US)

(73) Assignee: Polaris Industries Inc., Medina, MN (US)

( * ) Notice: Subject to any disclaimer, the term of this patent is extended or adjusted under 35 U.S.C. 154(b) by 123 days.

(21) Appl. No.: 17/125,057

(22) Filed: Dec. 17, 2020

(65) Prior Publication Data
US 2022/0194476 A1 Jun. 23, 2022

(51) Int. Cl.
*B62D 23/00* (2006.01)
(52) U.S. Cl.
CPC .................. *B62D 23/005* (2013.01)
(58) Field of Classification Search
CPC ...... B62D 23/005; B60R 21/13; B60R 21/131
USPC .............. 296/205, 190.03; 280/756
See application file for complete search history.

(56) References Cited

U.S. PATENT DOCUMENTS

| 8,997,908 | B2 * | 4/2015 | Kinsman | B62D 21/183 |
| | | | | 296/202 |
| 11,155,304 | B2 * | 10/2021 | Hisada | B62D 21/183 |
| 11,260,803 | B2 * | 3/2022 | Fredrickson | B62D 63/04 |
| 11,279,412 | B2 * | 3/2022 | Kim | B62D 25/14 |
| 11,352,055 | B2 * | 6/2022 | De Grammont | B62D 7/228 |
| 2021/0094627 | A1 * | 4/2021 | Clark | B60N 2/0717 |

OTHER PUBLICATIONS

2021 RZR Pro XP Aluminum Roof, Kemimoto Black Roof for 2 Seater Compatible with Polaris RZR Pro XP 2020, Amazon.com, first made available Nov. 14, 2019; 8 pages.
Polaris RZR XP 1000 Roll Cage—F16 Cage—ABF Fabrication, https://abffabrication.com/shop/polaris-rzr-xp-1000-roll-cage-f16-cage/, accessed Apr. 20, 2021, available at least as early as Oct. 2020; 5 pages.
Pro Armor Asylum Roof w/Light Bar Pocket—RZR XP 1000, Kombustion Motorsports, available at least as early as Oct. 2020; 3 pages.

* cited by examiner

*Primary Examiner* — Jason S Morrow
(74) *Attorney, Agent, or Firm* — Faegre Drinker Biddle & Reath LLP

(57) ABSTRACT

An upper frame portion of a frame of a vehicle includes a first longitudinal frame member having a first end and a second end and a second longitudinal frame member having a first end and a second end. The first longitudinal member and the second longitudinal member each include a first end and a second bend. The first bends and the second bends are positioned adjacent one another and forward of a seating area.

22 Claims, 13 Drawing Sheets

UPPER FRAME FOR AN OFF-ROAD VEHICLE

FIELD OF THE INVENTION

The present invention relates to off-road vehicles or utility vehicles ("UTVs"), specifically to upper frame portions of such vehicles.

BACKGROUND OF THE INVENTION

Generally, UTVs or off-road vehicles are used to carry one or more passengers and a small amount of cargo over a variety of terrains. Depending on the application of the vehicle, the rider preferences, and/or environmental conditions, it may be desirable to at least partially enclose a cab of the vehicle with a front windshield, a roof, a rear windshield, doors, side nets, and/or any other similar types of components. An upper frame of the vehicle is configured according to various specifications and also may be required to support any number of the above-mentioned cab components. Thus, a need exists for a frame that is capable of supporting additional components.

SUMMARY OF THE INVENTION

In one embodiment of the disclosure, a vehicle comprises a plurality of ground-engaging members, a frame assembly supported by the plurality of ground-engaging members and extending longitudinally between a front portion and a rear portion, and the frame assembly comprising a upper frame portion, and a seating area supported by the frame assembly, wherein the upper frame portion extends over the seating area, the upper frame portion including a first longitudinal frame member and a second longitudinal frame member, each of the first and the second longitudinal frame members including a first bend and a second bend, and both the first bend and the second bend being positioned forward of the seating area.

In another embodiment of the disclosure, an upper frame portion of a frame of a vehicle comprises a first longitudinal frame member having a first end and a second end, and a second longitudinal frame member having a first end and a second end, wherein each of the first longitudinal frame member and the second longitudinal frame member includes a first bend and a second bend, and the first bends and the second bends being and forward of a mid-point of the upper frame portion.

DETAILED DESCRIPTION OF THE DRAWINGS

Figure 1:
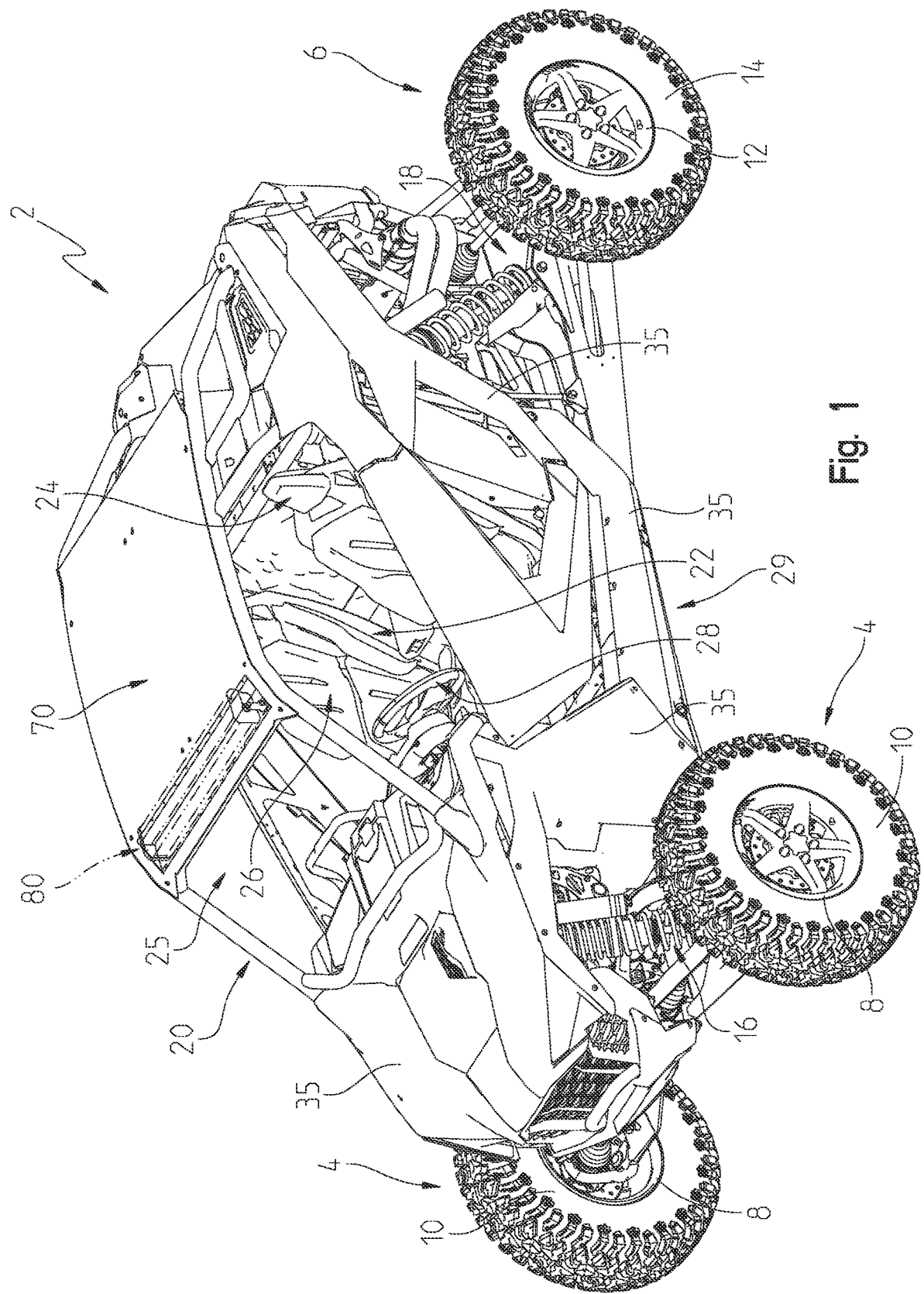
FIG. 1 shows a front left perspective view of a vehicle of the present disclosure.
Figure 2:
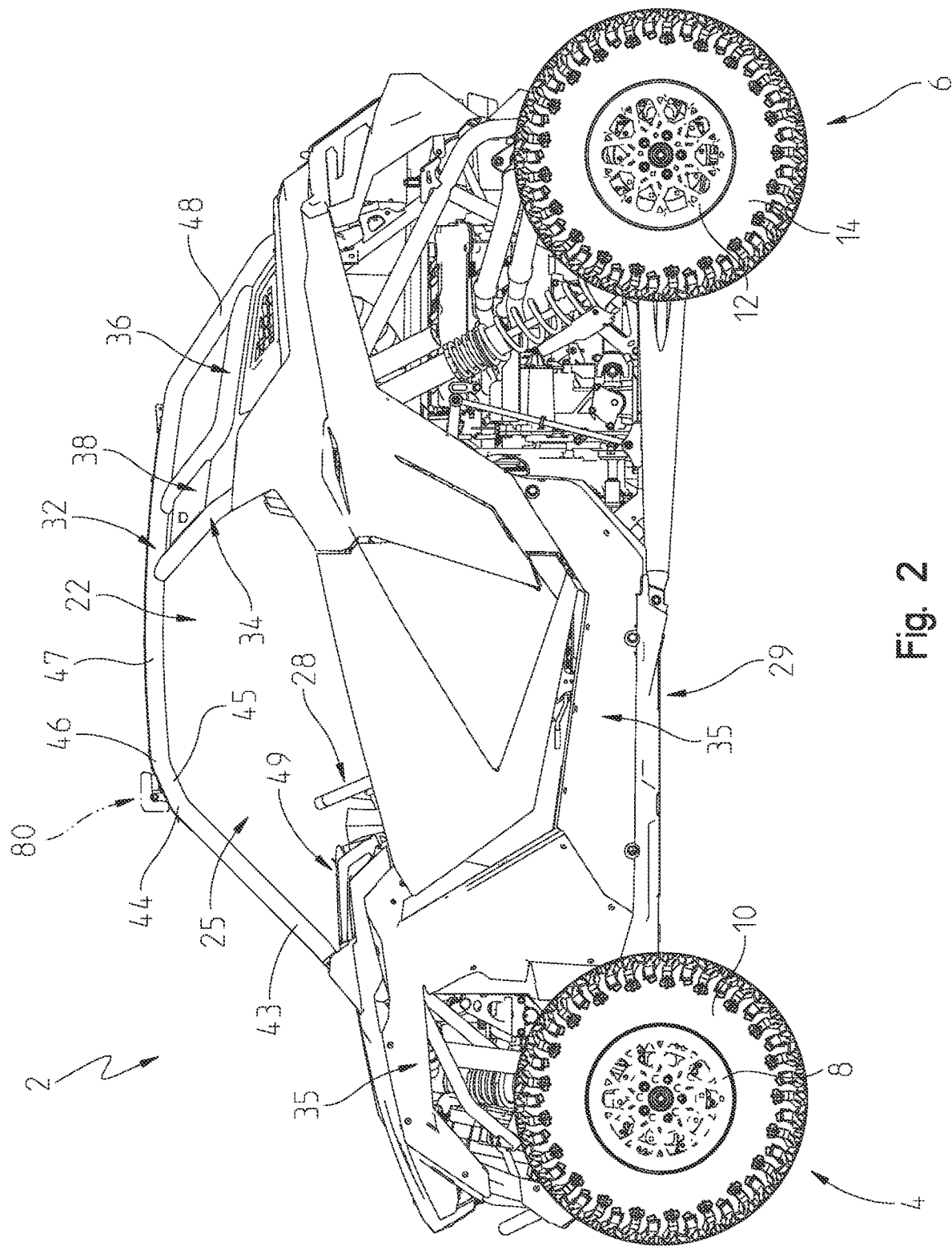
FIG. 2 shows a left side elevational view of the vehicle of FIG. 1.
Figure 3:
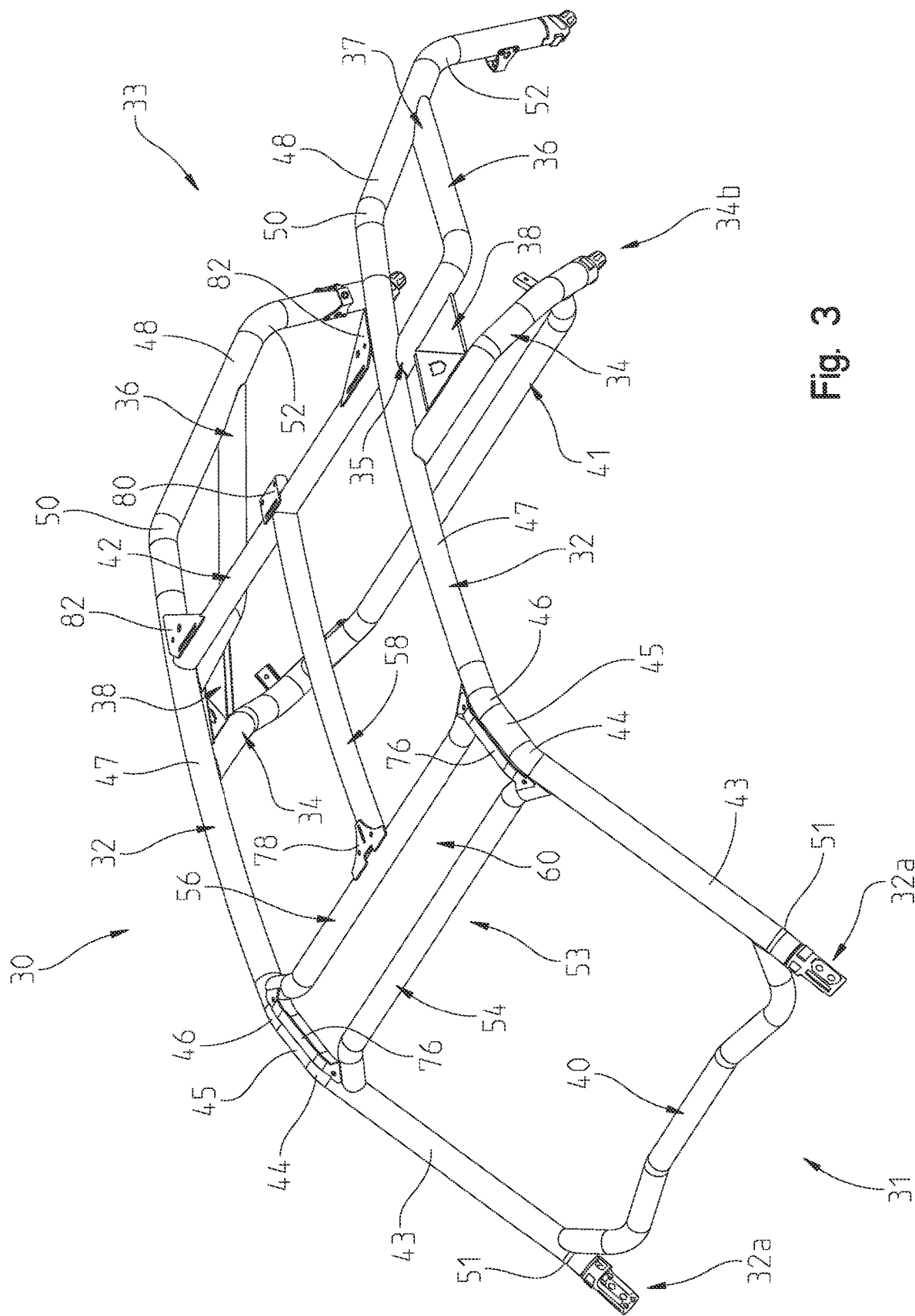
FIG. 3 shows a front left perspective view of an upper frame portion of the vehicle of FIG. 1.

With reference first to FIGS. 1 and 2, the vehicle of the present invention will be described. As shown, the vehicle is generally depicted as reference number 2 which includes front ground engaging members 4 and rear ground engaging members 6. Front ground engaging members 4 are comprised of rims 8 and tires 10 and rear ground engaging members 6 are comprised of rims 12 and tires 14. Alternatively, tracks or other ground-engaging members may be used with vehicle 2. Ground engaging members 4 and 6 support a vehicle frame, which is shown generally at 20, through front and rear suspension assemblies 16 and 18, respectively. Vehicle frame 20 supports a seating area 22 comprised of a driver's seat 24 and a front passenger seat 26. In various embodiments, seating area 22 may also include one or more rear passenger seats (not shown) positioned rearward of driver's seat 24 and front passenger seat 26. Vehicle 2 further includes a steering assembly for steering front ground engaging members 4 whereby the steering assembly includes a steering wheel 28.

Referring now to FIGS. 3-8, frame 20 of vehicle 2 is comprised of an upper frame portion or cab frame 30 that generally extends over seating area 22 and a lower frame portion 29 (FIG. 2) positioned below and coupled to cab frame 30. Frame 20 is configured to support various body panels 35 (FIG. 1). Cab frame 30 cooperates with seating area 22 to generally define a cab 25 of vehicle 2.

Cab frame 30 of frame 20 will now be described in further detail. Cab frame 30 generally includes a pair of longitudinal frame members 32 extending from a front 31 of cab frame 30 to a rear 33 of cab frame 30. Additionally, cab frame 30 includes a pair of downwardly-extending frame members 34 each extending from one of longitudinal frame members 32 and coupling cab frame 30 to lower frame portion 29. Cab frame 30 also includes a pair of rear frame members 36 (illustratively having an L-shape) each coupled at a first end 35 and a second end 37 to one of longitudinal frame members 32. Each rear frame member 36 may also be coupled to one of downwardly-extending frame members 34 via a bracket 38.

In various embodiments, cab frame 30 may further include a first laterally-extending frame member 40 coupled to and extending between front ends 32a of longitudinal frame members 32, a second laterally-extending frame member 41 coupled to and extending between lower ends 34b of downwardly-extending frame members 34, and/or a third laterally-extending frame member 42 coupled to and extending between longitudinal frame members 32 at a position adjacent first ends 35 of rear frame members 36 and rearward of driver's seat 24 and front passenger seat 26.

Longitudinal frame members 32 each include a front generally upstanding portion 43, a first bend 44, a second bend 46, and a middle portion 45 extending between first bend 44 and second bend 46. Longitudinal frame members 32 each also include a longitudinally-extending portion 47 coupled to a rear extent of front generally upstanding portion 43 and, more particularly, coupled to second bend 46. Additionally, longitudinal frame members 32 each include a generally upstanding rear portion 48 coupled to a rear extent of longitudinally-extending portion 47. Illustratively, front generally upstanding portion 43 is positioned forward of first and second bends 44 and 46 and longitudinally-extending portion 47 and rear portion 48 are positioned rearward of first and second bends 44 and 46. In one embodiment, longitudinal frame members 32 each define unitary or single frame members where front generally upstanding portion 43, longitudinally-extending portion 47, and rear portion 48 are integrally formed together. Alternatively, front generally upstanding portion 43, longitudinally-extending portion 47, and rear portion 48 may be coupled together through conventional fasteners and/or fastening mechanisms, such as bolts, screws, weld, adhesive, rivets, and the like.

Figure 4:
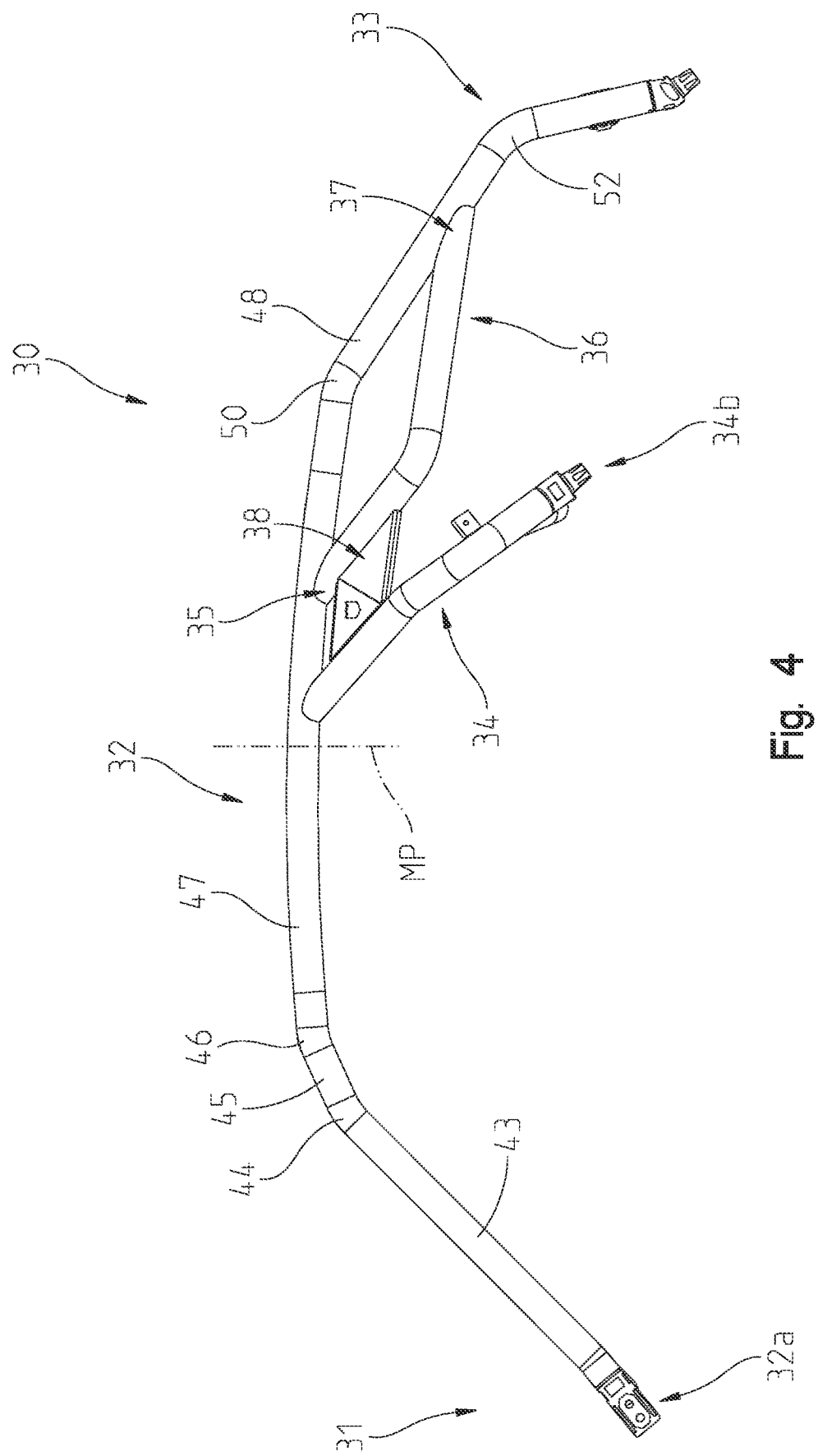
FIG. 4 shows a left side elevational view of the upper frame portion of FIG. 3.
Figure 5:
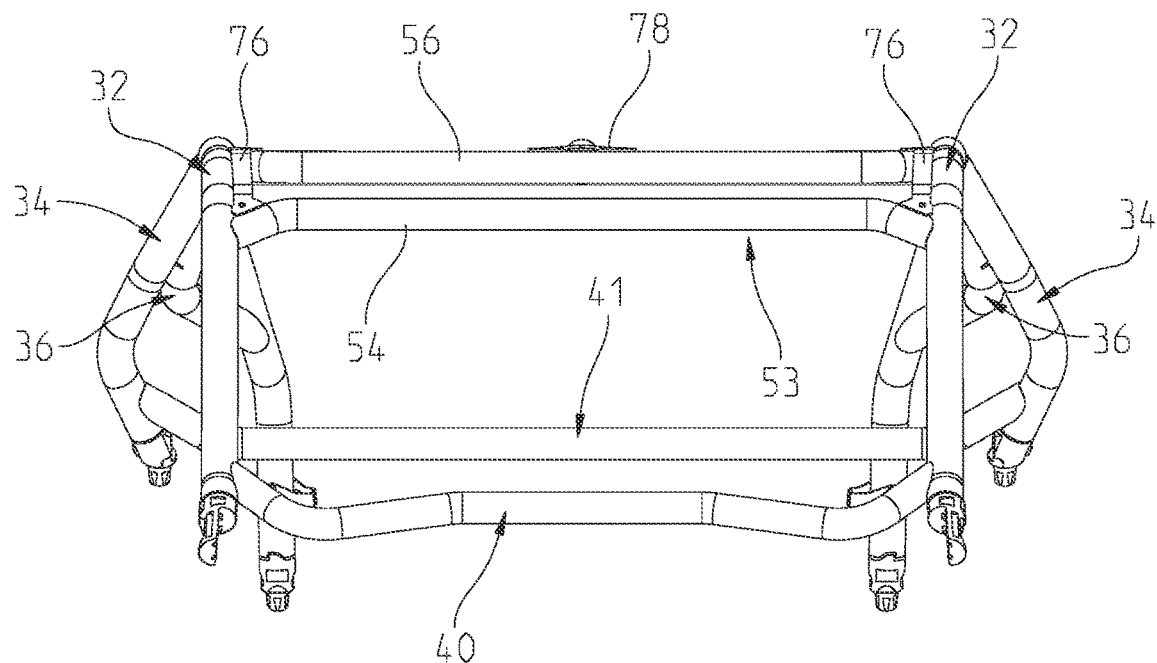
FIG. 5 shows a front elevational view of the upper frame portion of FIG. 3.
Figure 6:
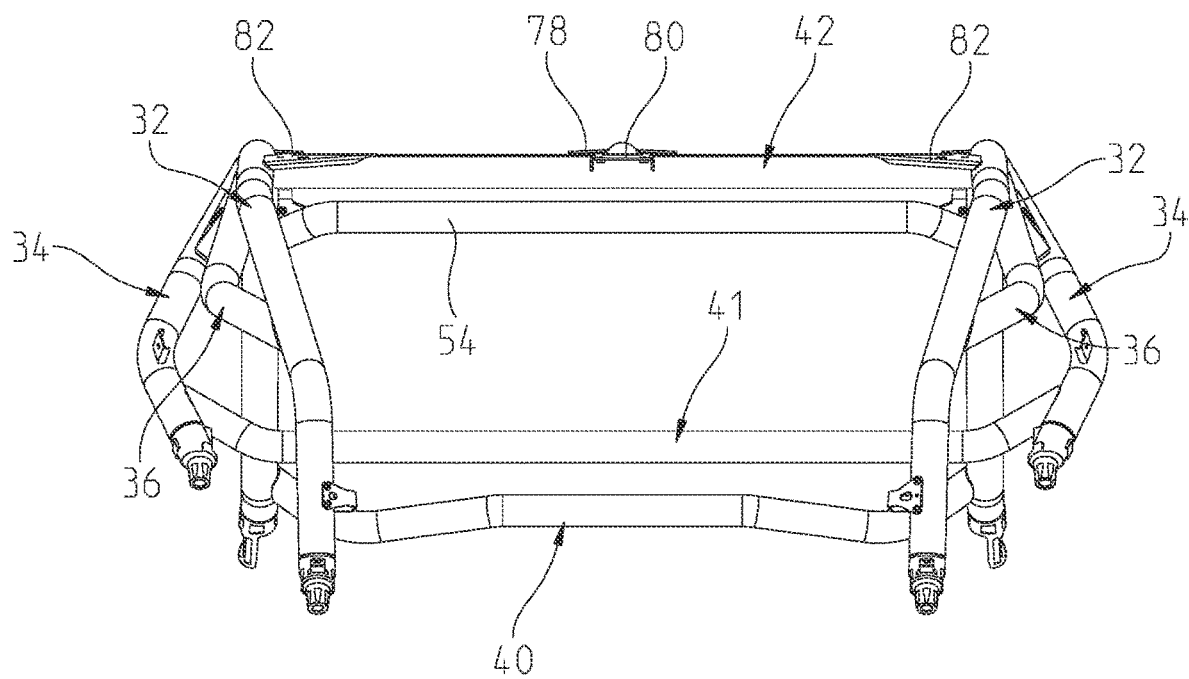
FIG. 6 shows a rear elevational view of the upper frame portion of FIG. 3.
Figure 7:
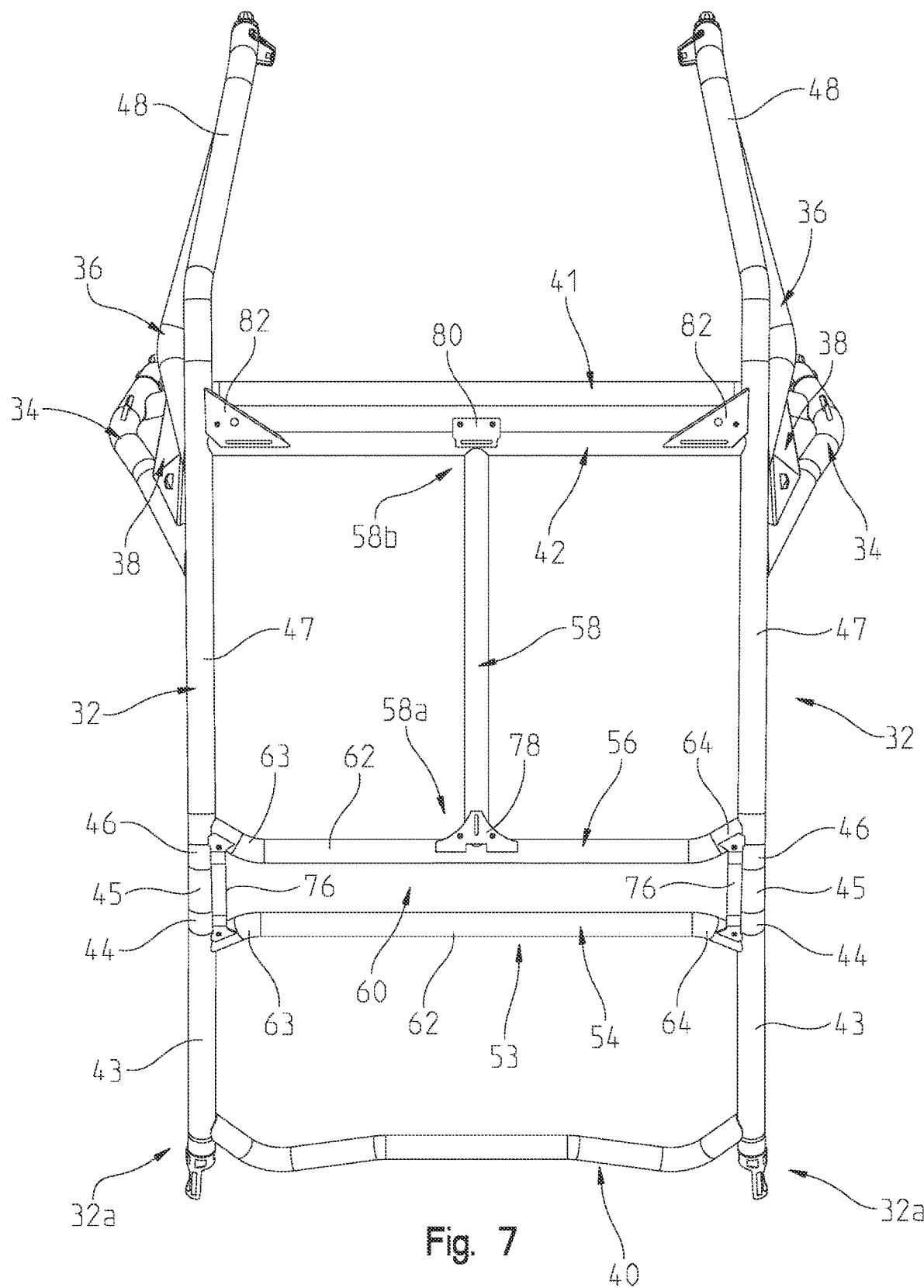
FIG. 7 shows a top plan view of the upper frame portion of FIG. 3.
Figure 8:
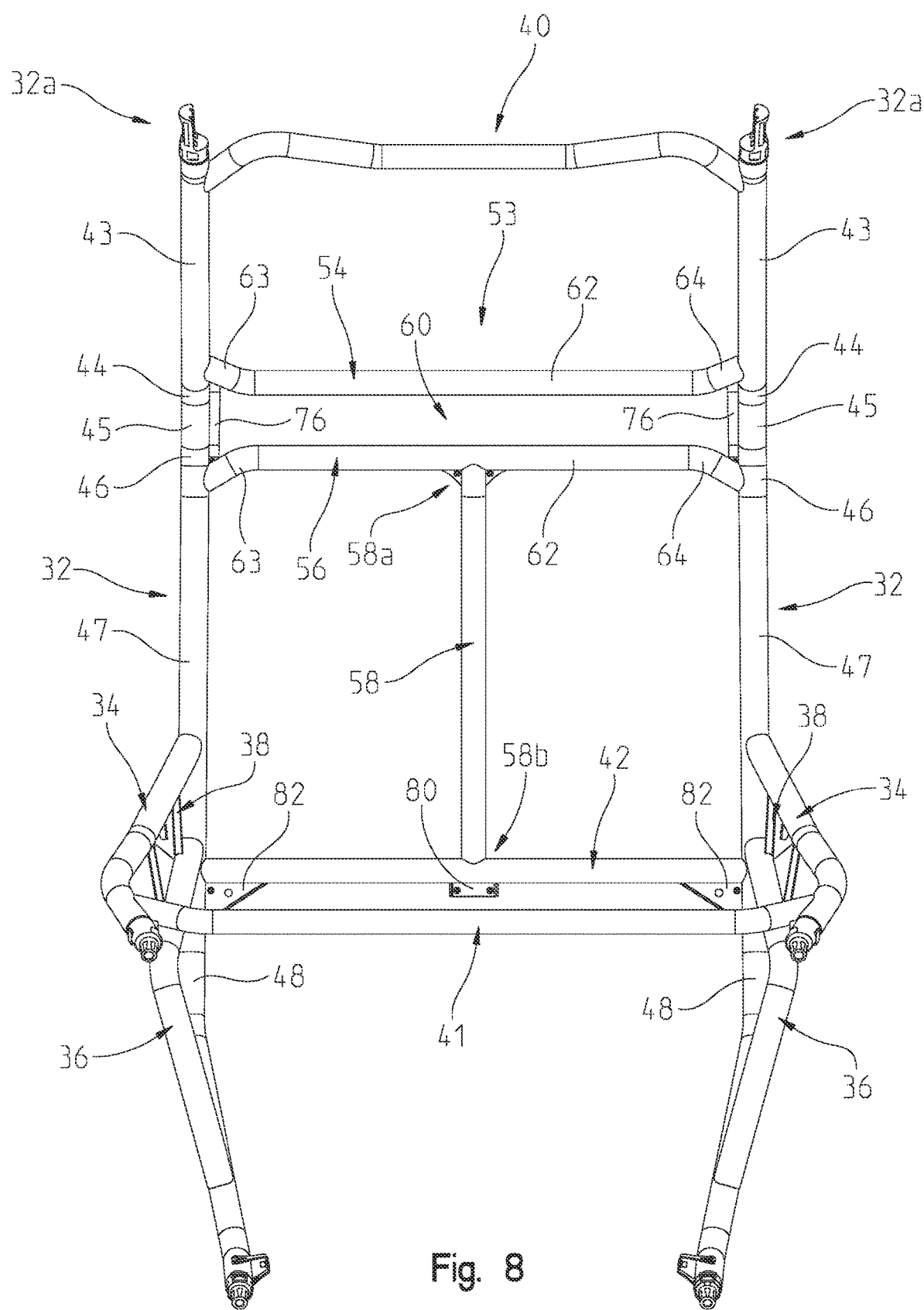
FIG. 8 shows a bottom plan view of the upper frame portion of FIG. 3.

A rear end 43b of front generally upstanding portion 43 is coupled to first bend 44 and a forward end 47a of longitudinally-extending portion 47 is coupled to second bend 46. In various embodiments, middle portion 45 extending between first bend 44 and second bend 46 may be approximately 1-36 inches long or any range therewithin. For example, middle portion 45 may be approximately 1-30 inches in various embodiments, 2-12 inches in other various embodiments, 2-18 inches in yet other various embodiments, or 3-6 inches in yet other various embodiments. Illustratively, middle portion 45 is approximately 3.5 inches long. Both bends 44 and 46 of longitudinal frame members 32 are positioned forward of seating area 22 and forward of a mid-point MP of longitudinal frame member 32 (FIG. 4). In various embodiments, bends 44 and 46 may be positioned vertically higher than but rearward of a dash 49 of vehicle 2 and/or directly vertically above a portion of dash 49 and/or steering wheel 28. Rear portion 48 of longitudinal frame member 32 may further include a third bend 50 and/or a fourth bend 52, where both bends 50 and 52 are positioned rearward of first and second bends 44 and 46 and seating area 22. In various embodiments, longitudinal frame member 32 may include a bend 51 forward of first and second bends 44 and 46 in addition to or alternative to third and fourth bends 50 and 52 rearward of first and second bends 44 and 46. As such, any of the bends disclosed herein may be positioned in relative spacing to each other and configured with the functional ability and structure of the other bends.

In various embodiments, cab frame 30 may further include a support component 53 extending between the two longitudinal frame members 32. In various embodiments, support component 53 may include a first laterally-extending frame member 54 extending between first bends 44 of longitudinal frame members 32 and/or a second laterally-extending frame member 56 extending between second bends 46 of longitudinal fame members 32. In various embodiments, frame members 54, 56 may be positioned at any location along a length of front generally upstanding portions 43 and/or longitudinally-extending portions 47 which allow frame members 54, 56 to support additional components on vehicle 2, as disclosed herein, and does not interfere with the line of the sight of the operator.

Laterally-extending frame members 54 and 56 are positioned forward of second and third laterally-extending frame members 41 and 42, and rearward of first laterally-extending frame member 40. When cab frame 30 includes laterally-extending frame members 54 and/or 56, cab frame 30 may further include a longitudinally-extending frame member 58 extending between frame member 54 or 56 and third laterally-extending frame member 42. When cab frame 30 includes both laterally-extending frame members 54 and 56, an opening 60 is formed between frame members 54 and 56 and portions of longitudinal frame members 32, illustratively middle portion 45 and/or bends 44 and 46.

Figure 9:
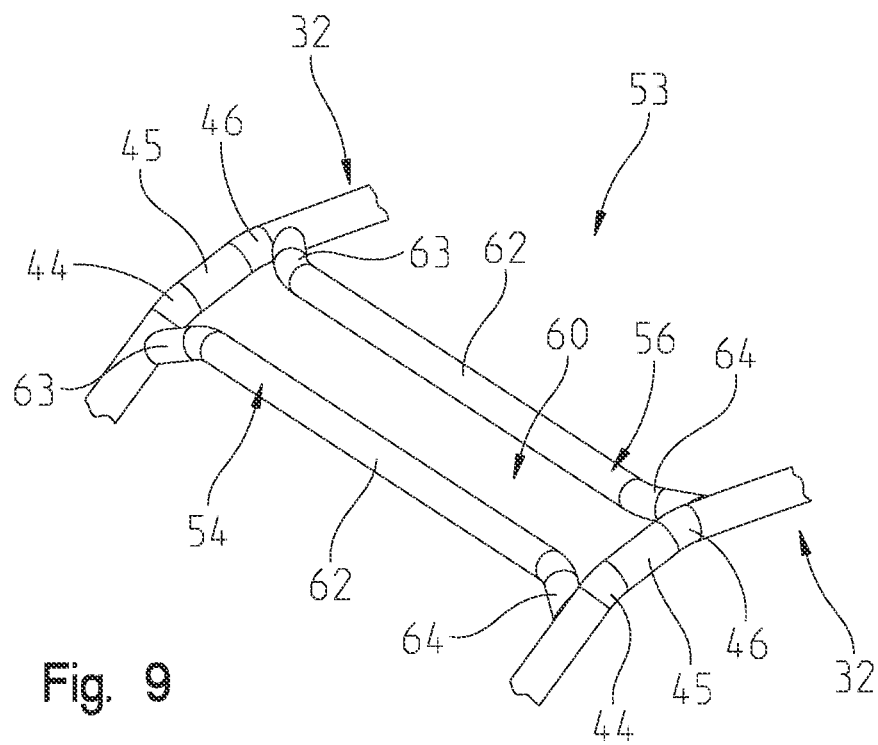
FIG. 9 shows an enlarged perspective view of a first embodiment of a portion of the upper frame portion of FIG. 3.
Figure 10:
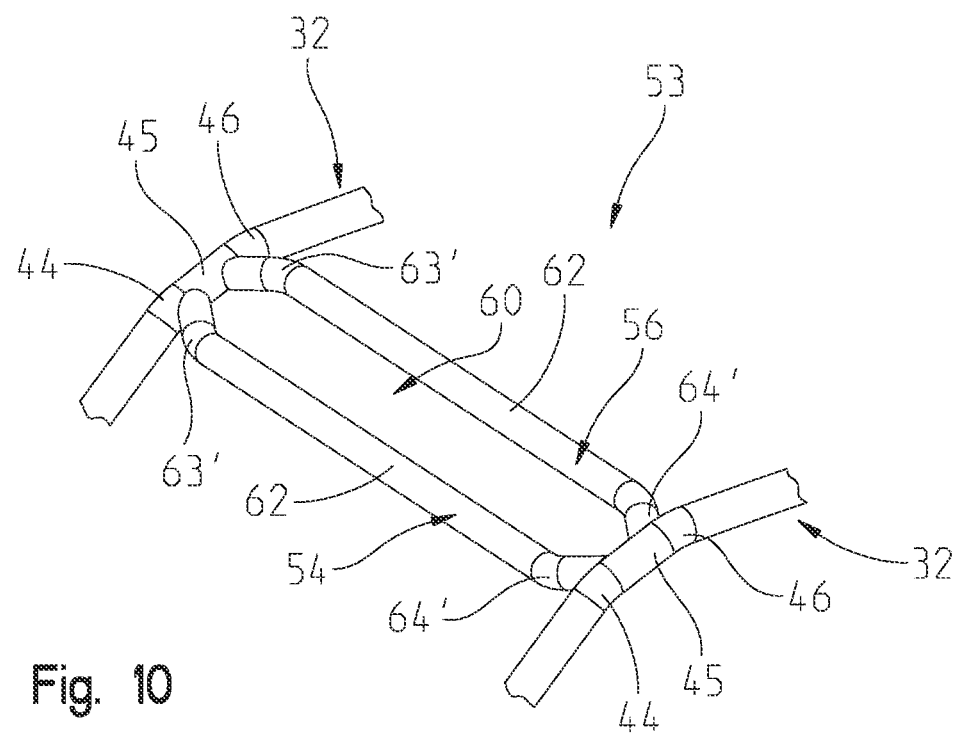
FIG. 10 shows an enlarged perspective view of a second embodiment of the portion of the upper frame portion of FIG. 9.
Figure 11:
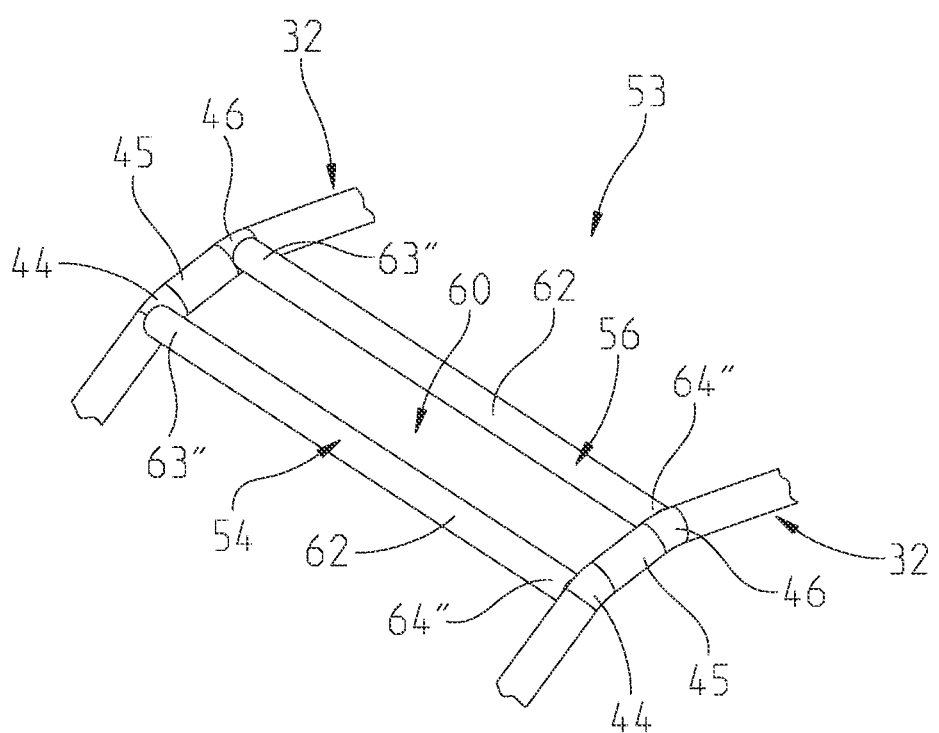
FIG. 11 shows an enlarged perspective view of a third embodiment of the portion of the upper frame portion of FIG. 9.
Figure 12:
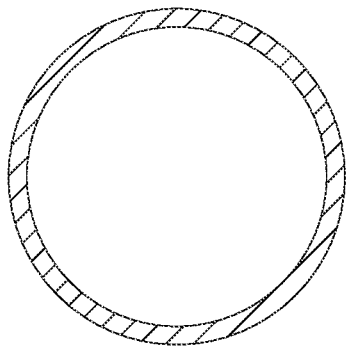
FIG. 12 shows a cross-sectional view of a first embodiment of a frame tube the present disclosure.
Figure 13:
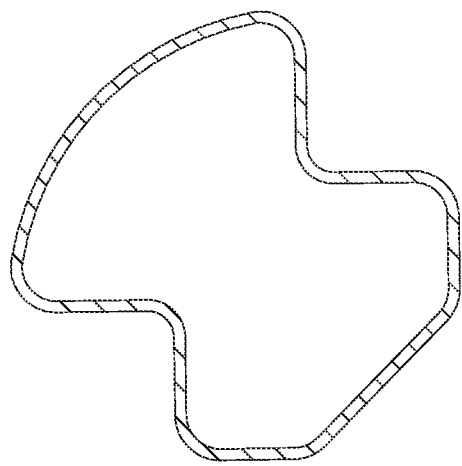
FIG. 13 shows a cross-sectional view of a second embodiment of a frame tube the present disclosure.
Figure 14:
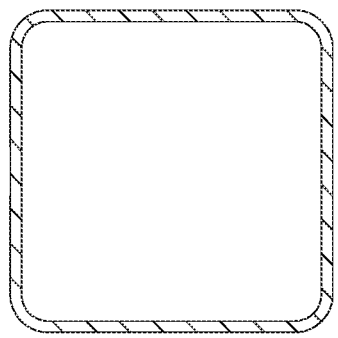
FIG. 14 shows a cross-sectional view of a third embodiment of a frame tube the present disclosure.
Figure 15:
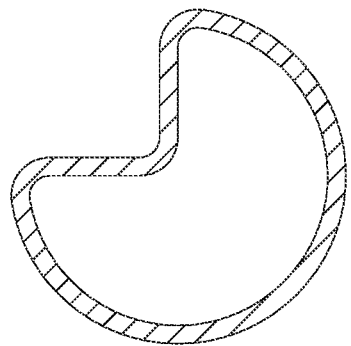
FIG. 15 shows a cross-sectional view of a fourth embodiment of a frame tube the present disclosure

With reference to FIGS. 9-11, each of laterally-extending frame members 54 and 56 includes a linear center portion 62 and outer portions 63 and 64 at each end of center portion 62. Outer portions 63 extend between straight center portion 62 and longitudinal frame members 32. Various embodiments of outer portions are shown as 63, 63', 63" and 64, 64', 64" of laterally-extending frame members 54 and 56 may flare outward or be angled away from each other (FIG. 9), flare inward or be angled towards each other (FIG. 10), or be aligned with center portion 62 and extend coaxially to longitudinal frame members 32 as extensions of center portion 62 (FIG. 11).

When outer portions 63 and 64 are angled away from each other as shown in FIG. 9, outer portions 63 and 64 of laterally-extending member 54 may couple to longitudinal frame members 32 forward of first bend 44 and outer portions 63 and 64 of laterally-extending member 56 may couple to longitudinal frame members 32 rearward of second bend 46. When outer portions 63' and 64' are angled towards each other as shown in FIG. 10, outer portions 63' and 64' of laterally-extending member 54 may couple to longitudinal frame members 32 rearward of first bend 44 and outer portions 63' and 64' of laterally-extending member 56 may couple to longitudinal frame members 32 forward of second bend 46. When outer portions 63" and 64" are aligned with center portion 62 and extend coaxially to longitudinal frame members 32 as shown in FIG. 11, outer portions 63" and 64" of laterally-extending member 54 may couple to longitudinal frame members 32 forward, at or rearward of first bend 44 and outer portions 63" and 64" of laterally-extending member 56 may couple to longitudinal frame members 32 forward, at or rearward of second bend 46.

Referring now to FIGS. 12-15, frame members 32, 34, 36, 40, 41, 42, 54, 56, and/or 58 may have various cross-sections. The cross-sectional profile of frame members 32, 34, 36, 40, 41, 42, 54, 56, and/or 58 may allow cab frame 30 to support additional component at a position flush with a portion of these frame members and/or may provide a desired amount of support and/or strength. The various cross-sections may include a circular cross-section (FIG. 12), an hour-glass or peanut cross-section (FIG. 13), a square cross-section (FIG. 14), an indented or recessed cross-section (FIG. 15), an oval or elliptical cross-section (not shown), or other various cross-sections.

Figure 16:
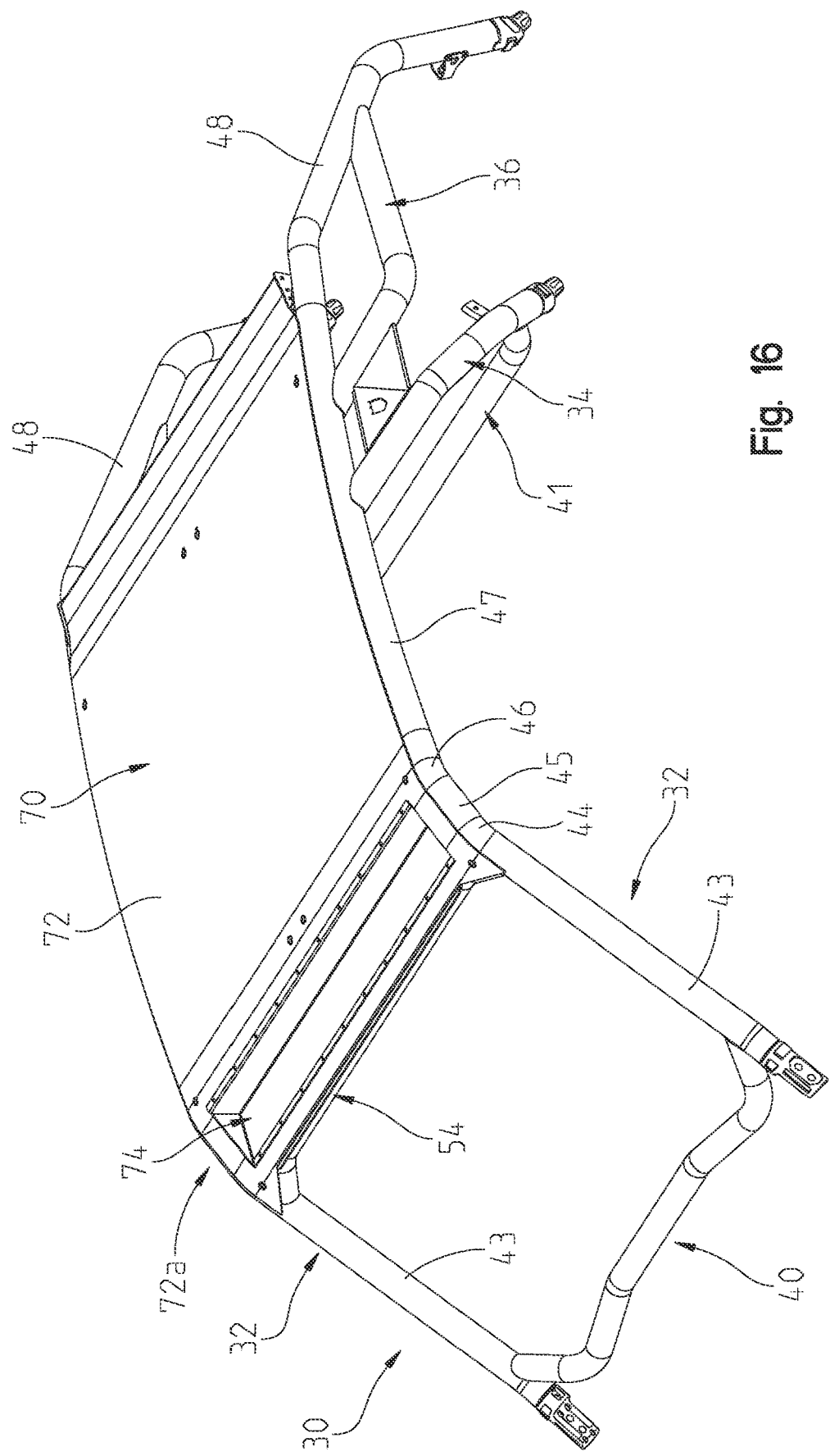
FIG. 16 shows a front left perspective view of the upper frame portion of FIG. 3 and a roof of the vehicle of FIG. 1.
Figure 17:
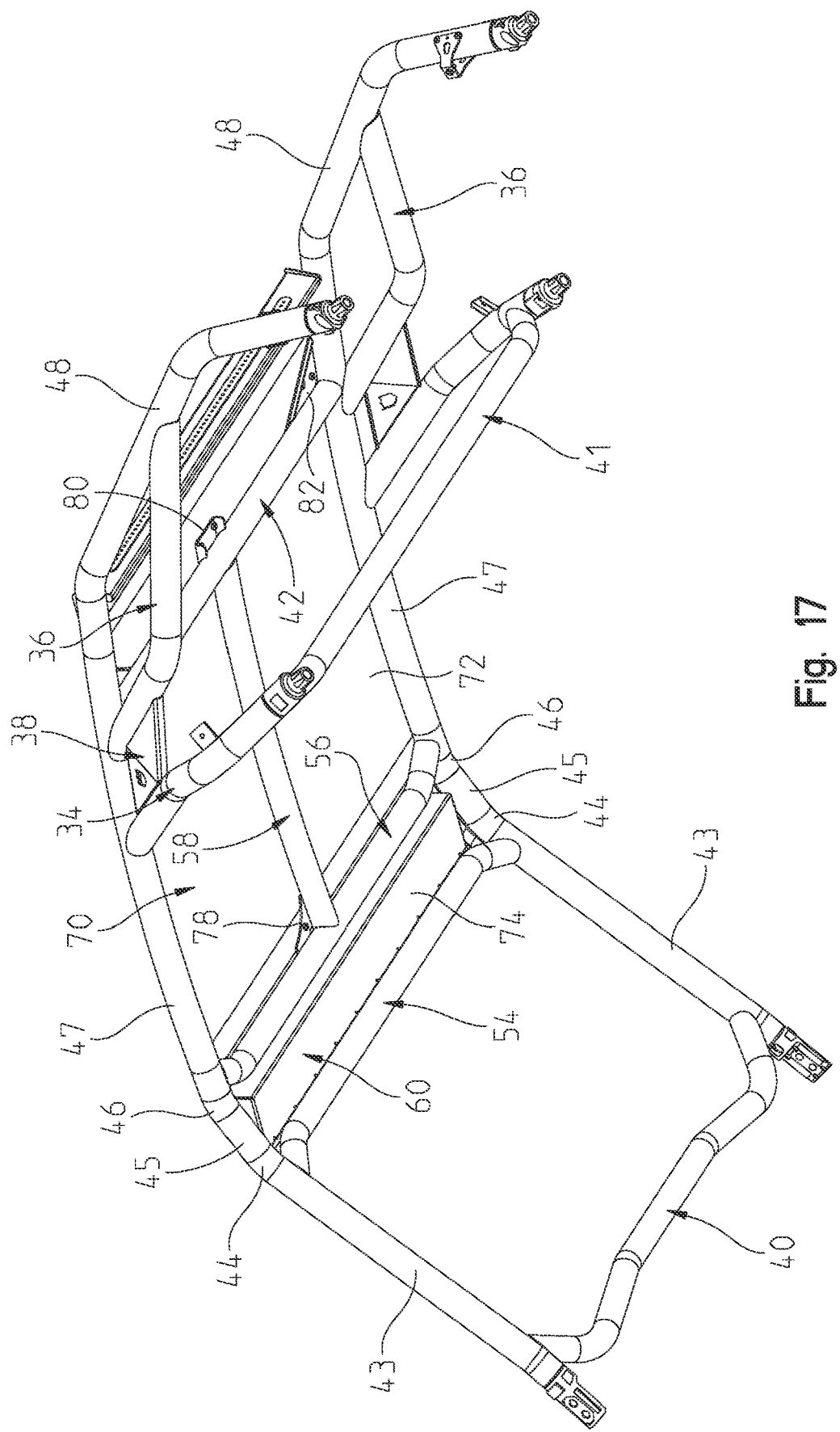
FIG. 17 shows a rear left perspective view of the upper frame portion and the roof of FIG. 16.
Figure 18:
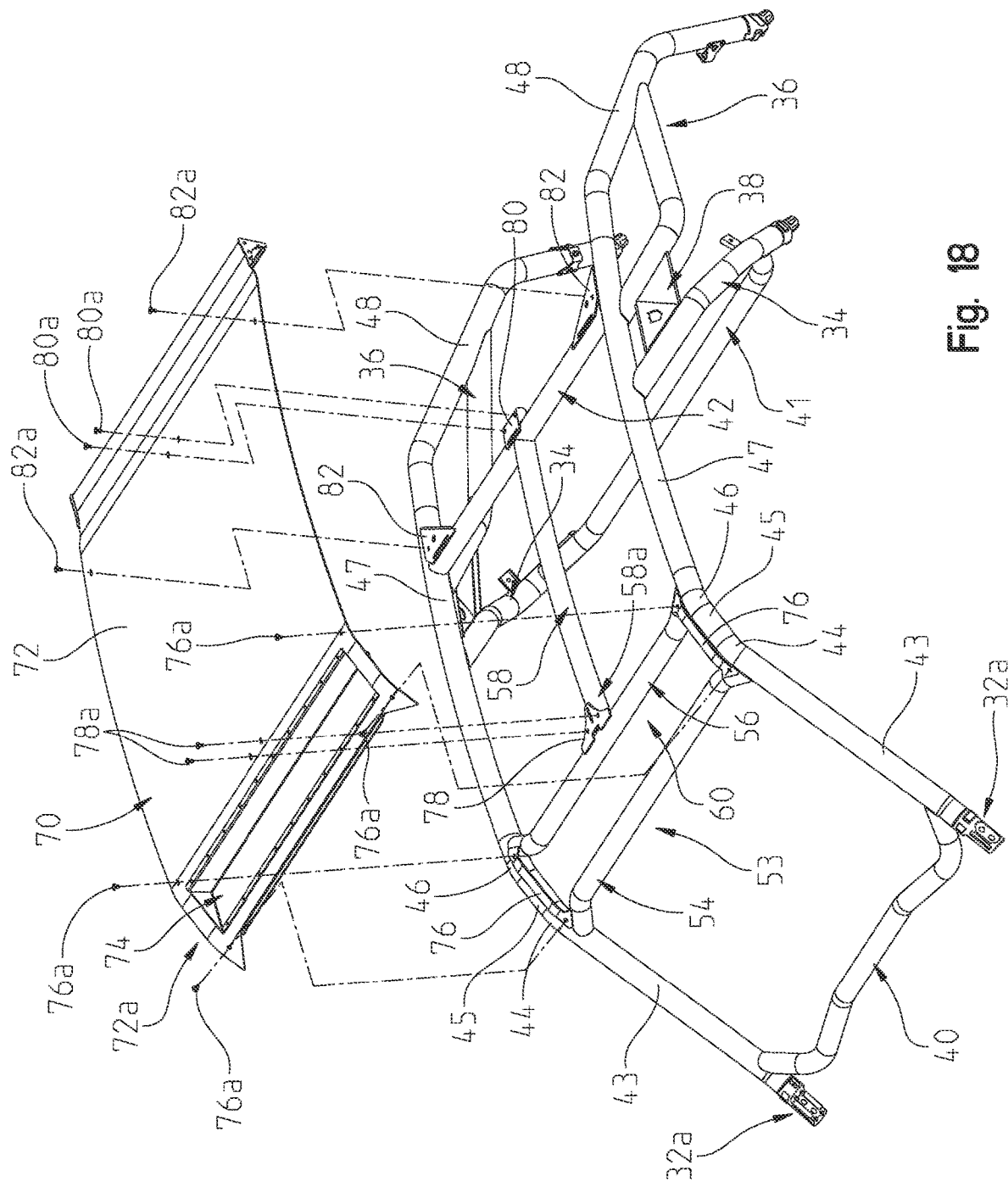
FIG. 18 shows an exploded front left perspective view of the upper frame portion and the roof of FIG. 16.

With reference now to FIGS. 16-18, as noted herein, at least a portion of cab 25 may be enclosed. For example, vehicle 2 may further include a roof 70 coupled to cab frame 30. Roof 70 generally includes a body 72 extending from laterally-extending frame member 54 rearwardly to at least third laterally-extending frame member 42. In various embodiments, roof 70 may include a pocket 74 at a front end 72a of body 72, where pocket 74 is generally configured to be positioned adjacent or within opening 60 between laterally-extending frame members 54 and 56. Pocket 74 may be integrally formed with body 72 or removably coupled to body 72. In various embodiments, pocket 74 is shaped and sized to receive a light bar 80 (FIG. 1).

Roof 70 may be coupled to frame members 54, 56, 42, 58, and/or 32 of cab frame 30. For instance, roof 70 may be coupled to frame members 44 and 46 via a longitudinal bracket 76 extending between frame members 44 and 46 and couplers 76a. Roof 70 also may be coupled to frame member 56 and a first end 58a of frame member 58 via a triangular bracket 78 and couplers 78a. Additionally, roof 70 may be coupled to a second end 58b of frame member 58 and frame member 42 via a square bracket 80 and couplers 80a and/or to ends 42a and 42b of frame member 42 and longitudinal frame members 42 via angled brackets 82 and couplers 82a.

It may be appreciated that the weight of roof 70 at pocket 74 is heavier than at other portions of roof 70 because light bar 80 is positioned at pocket 74. As such, support component 53 is configured to provide additional support to cab frame 30 when roof 70 and, specifically light bar 80, is coupled thereto. Further, the configuration of bends 44 and 46 may increase the strength of cab frame 30 as frame members 32 transition from front generally upstanding members 43 to longitudinally-extending portion 47. Support component 53 may further increase the strength at this location of cab frame 30.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
a plurality of ground-engaging members;
a frame assembly supported by the plurality of ground-engaging members and extending longitudinally between a front portion and a rear portion, and the frame assembly comprising an upper frame portion;
a seating area supported by the frame assembly, the seating area including at least one seat, wherein the upper frame portion extends over the seating area, the upper frame portion including a first longitudinal frame member and a second longitudinal frame member, each of the first and the second longitudinal frame members including a first bend and a second bend, and both the first bend and the second bend being positioned forward of the seating area; and
wherein the first bend and the second bend are positioned at a vertical height that is greater than a vertical height of an uppermost portion of the at least one seat.

2. The vehicle of claim 1, wherein the upper frame portion further includes a support component extending between the first and second bends of each of the first and second longitudinal frame members.

3. The vehicle of claim 2, wherein the support component includes a first laterally-extending frame member.

4. The vehicle of claim 3, wherein the support component further includes a second laterally-extending frame member, the first laterally-extending frame member extending between the first bend of the first longitudinal frame member and the first bend of the second longitudinal frame member and the second laterally-extending frame member extending between the second bend of the first longitudinal frame member and the second bend of the second longitudinal frame member.

5. The vehicle of claim 4, wherein each end of the first laterally-extending frame member and each end of the second laterally-extending frame member include outer ends angled away from each other.

6. The vehicle of claim 4, wherein each end of the first laterally-extending frame member and each end of the second laterally-extending frame member include outer ends angled towards each other.

7. The vehicle of claim 4, wherein the first laterally-extending frame member and the second laterally-extending frame each extend laterally from the first longitudinal frame member to the second longitudinal frame member.

8. The vehicle of claim 1, further comprising a steering wheel operably coupled to at least two of the plurality of ground-engaging members, wherein the first bends and the second bends of the first and second longitudinal members are positioned above the steering wheel.

9. The vehicle of claim 1, wherein the first longitudinal frame member and the second longitudinal frame member each include a generally upstanding frame member positioned forward of the first bend and the second bend, and a rear end of the generally upstanding frame member is coupled to the first bend.

10. The vehicle of claim 1, wherein the first longitudinal frame member and the second longitudinal frame member each includes a portion extending between the first bend and the second bend, and the portion is approximately 1 to 36 inches in length.

11. An upper frame portion of a frame of a vehicle, comprising:
a first longitudinal frame member having a first end and a second end;
a second longitudinal frame member having a first end and a second end, wherein each of the first longitudinal frame member and the second longitudinal frame member includes a first bend and a second bend, and the first bends and the second bends being and forward of a mid-point of the upper frame portion; and
a support component including a first laterally-extending frame member extending between the first bend of the first longitudinal frame member and the first bend of the second longitudinal frame member, and a second laterally-extending frame member extending between the second bend of the first longitudinal frame member and the second bend of the second longitudinal frame member, wherein each end of the first laterally-extending frame member and the second laterally-extending frame member include outer ends angled away from each other.

12. The upper frame portion of claim 11, wherein the first longitudinal frame member and the second longitudinal frame member each includes a portion extending between the first bend and the second bend, and the portion is approximately 1 to 36 inches in length.

13. The upper frame portion of claim 12, wherein the portion is approximately 3.5 inches in length.

14. The upper frame portion of claim 11, wherein an opening is created between the first and second longitudinal frame members and the first and second laterally-extending frame members.

15. The upper frame portion of claim 11, wherein each end of each of the first laterally-extending frame member and the second laterally-extending frame member include outer ends angled towards each other.

16. The upper frame portion of claim 11, wherein the first laterally-extending frame member and the second laterally-extending frame each extend laterally from the first longitudinal frame member to the second longitudinal frame member.

17. The upper frame portion of claim 11, wherein the first longitudinal frame member and the second longitudinal frame member each include a generally upstanding frame member positioned forward of the first bend and the second bend, a rear end of the generally upstanding frame member being coupled to the first bend.

18. The upper frame portion of claim 17, wherein the first longitudinal frame member and the second longitudinal frame member each include a longitudinally-extending frame member positioned rearward of the first bend and the second bend, a forward end of the longitudinally-extending frame member being coupled to the second bend.

19. An upper frame portion of a frame of a vehicle, comprising:
   a first longitudinal frame member having a first end and a second end; and
   a second longitudinal frame member having a first end and a second end, wherein each of the first longitudinal frame member and the second longitudinal frame member includes a first bend and a second bend, and the first bends and the second bends being and forward of a mid-point of the upper frame portion;
   a support component having a first laterally-extending frame member extending between the first longitudinal frame member and the second longitudinal frame member and a second laterally-extending frame member extending between the first longitudinal frame member and the second longitudinal frame member, wherein each end of the first laterally-extending frame member and the second laterally-extending frame member include outer ends angled away from each other; and
   a third laterally-extending frame member extending between the first longitudinal frame member and the second longitudinal frame member, the third laterally-extending frame member arranged forward of the first bend and the second bend and at a vertical height that is less than a vertical height of the first bend and the second bend.

20. An upper frame portion of a frame of a vehicle configured to be releasably coupled with a lower frame portion of the vehicle, comprising:
   a first longitudinal frame member having a first end and a second end;
   a second longitudinal frame member having a first end and a second end, wherein each of the first longitudinal frame member and the second longitudinal frame member includes a first bend and a second bend, and the first bends and the second bends being and forward of a mid-point of the upper frame portion;
   a first longitudinal bracket coupled with the first longitudinal frame member and extending between the first and the second bend of the first longitudinal frame member and a second longitudinal bracket coupled with the second longitudinal frame member and extending between the first and the second bend of the second longitudinal frame member, the first longitudinal bracket and the second longitudinal bracket each configured for supporting a roof of the vehicle.

21. The vehicle of claim 1, further comprising a dash arranged forward of the seating area support by the frame assembly, wherein the first bend and the second bend are arranged above a portion of the dash.

22. The vehicle of claim 1, wherein the plurality of ground-engaging members includes at least one front ground-engaging member and at least one rear ground-engaging member, and wherein the first bend and the second bend are positioned entirely rearward of the least one front ground-engaging member.

\* \* \* \* \*